United States Patent
Shimamori

(10) Patent No.: US 10,355,545 B2
(45) Date of Patent: Jul. 16, 2019

(54) ROTATING-ELECTRIC-MACHINE ROTOR STRUCTURE, AND ROTATING ELECTRIC MACHINE

(71) Applicant: FANUC CORPORATION, Yamanashi (JP)

(72) Inventor: Takahiro Shimamori, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 130 days.

(21) Appl. No.: 15/596,757

(22) Filed: May 16, 2017

(65) Prior Publication Data

US 2017/0338708 A1   Nov. 23, 2017

(30) Foreign Application Priority Data

May 20, 2016  (JP) ................................ 2016-101115

(51) Int. Cl.
*H02K 1/27* (2006.01)
*H02K 1/28* (2006.01)

(52) U.S. Cl.
CPC ............. *H02K 1/28* (2013.01); *H02K 1/2706* (2013.01); *H02K 1/278* (2013.01)

(58) Field of Classification Search
CPC .......... H02K 1/28; H02K 1/27; H02K 1/2706; H02K 1/278; H02K 1/2766; H02K 15/03
USPC ........... 310/156.21, 156.23, 156.38, 156.47, 310/156.53, 156.56, 156.57
See application file for complete search history.

(56) References Cited

U.S. PATENT DOCUMENTS

| | | | |
|---|---|---|---|
| 7,348,704 B2 * | 3/2008 | Kim .................... | H02K 1/2733 310/156.13 |
| 7,545,067 B2 * | 6/2009 | Drexlmaier ............ | H02K 1/278 310/156.08 |
| 2004/0217664 A1 | 11/2004 | Kuwabara et al. | |
| 2009/0015091 A1 | 1/2009 | Yang et al. | |

(Continued)

FOREIGN PATENT DOCUMENTS

| CN | 105594101 A | 5/2016 |
|---|---|---|
| JP | H08290265 A | 11/1996 |

(Continued)

OTHER PUBLICATIONS

Japanese Office Action dated May 29, 2018, for Japanese Patent Application No. 2016-101115.

(Continued)

*Primary Examiner* — Quyen P Leung
*Assistant Examiner* — Leda T Pham
(74) *Attorney, Agent, or Firm* — Karceski IP Law, PLLC

(57) ABSTRACT

The present invention suppresses magnets peel off from a rotor core due to a difference in the amount of thermal expansion between the magnets and the rotor core. Provided is a rotating-electric-machine rotor structure that includes: a cylindrical rotor core and a plurality of permanent magnets that are adhered to an outer circumferential surface of the rotor core with an adhesive. An adhesion surface of the rotor core, to which the permanent magnets are adhered, is provided with a plurality of protrusions that are spaced apart from one another along a surface of the rotor core, that extend radially outward direction, and that are able to deform in a direction in which the protrusions are spaced apart from one another.

5 Claims, 5 Drawing Sheets

(56) References Cited

U.S. PATENT DOCUMENTS

2009/0261677 A1* 10/2009 Ishikawa ............... H02K 1/278
                                                        310/156.12
2016/0241096 A1    8/2016 Mueller

FOREIGN PATENT DOCUMENTS

| JP | 11-089141    | 3/1999  |
|----|--------------|---------|
| JP | H11332147 A  | 11/1999 |
| JP | 2002-078257  | 3/2002  |
| JP | 2004-187411  | 7/2004  |
| JP | 2005-057835  | 3/2005  |
| JP | 2005318672 A | 11/2005 |
| JP | 2007-068270  | 3/2007  |
| JP | 2008-236862  | 10/2008 |
| JP | 2010154587 A | 7/2010  |

OTHER PUBLICATIONS

Japanese Search Report dated May 23, 2018, for Japanese Patent Application No. 2016-101115.
Chinese Office Action dated Apr. 2, 2019, for Chinese Patent Application No. 201710247903.3.

* cited by examiner

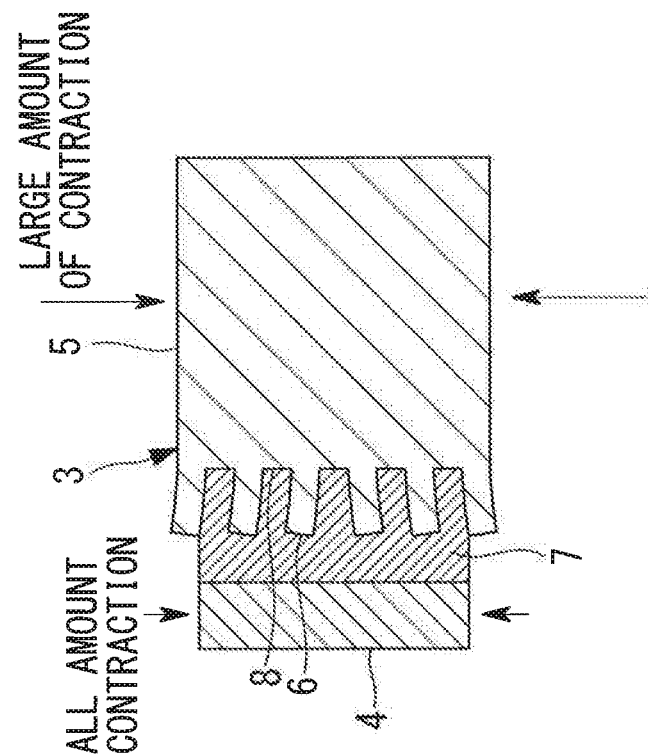
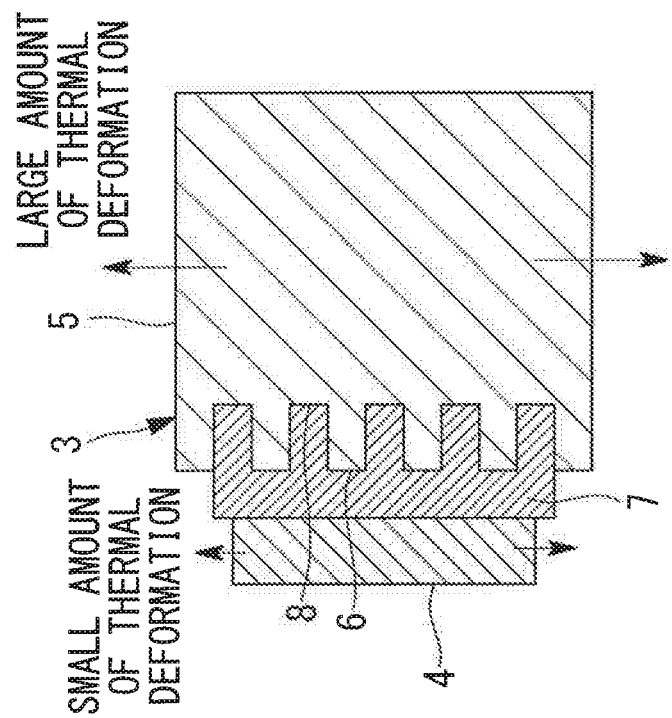

DURING HIGH TEMPERATURE

DURING NORMAL TEMPERATURE

ROTATING-ELECTRIC-MACHINE ROTOR STRUCTURE, AND ROTATING ELECTRIC MACHINE

CROSS-REFERENCE TO RELATED APPLICATIONS

This application is based on and claims priority to Japanese Patent Application No. 2016-101115, filed on May 20, 2016, the entire contents of which are incorporated herein by reference.

FIELD OF THE INVENTION

The present invention relates to a rotating-electric-machine rotor structure, and a rotating electric machine.

BACKGROUND OF THE INVENTION

In the related art, there is a known rotor structure in which magnets are bonded to the surface of the rotor core of a rotor (for example, refer to Japanese Unexamined Patent Application Publication No. 2002-78257).

In this rotor structure, the magnets are bonded to the rotor core using an adhesive, and the adhesive is then cured by being heated.

SUMMARY OF THE INVENTION

An object of the present invention is to provide a rotating-electric-machine rotor structure and a rotating electric machine that can suppress magnets peel off from a rotor core due to a difference in the amount of thermal expansion between the magnets and the rotor core.

An aspect of the present invention provides a rotating-electric-machine rotor structure that includes: a cylindrical rotor core; and a plurality of permanent magnets that are adhered to an outer circumferential surface of the rotor core with an adhesive; wherein an adhesion surface of the rotor core, to which the permanent magnets are adhered, is provided with a plurality of protrusions that are arranged so as to be spaced apart from one another along a surface of the rotor core, that extend radially outward direction, and that are able to deform in a spacing direction.

In the above-described aspect, the plurality of protrusions may be arranged so as to be spaced apart from one another in an axial direction of the rotor core.

In the above-described aspect, the rotor core may be formed by stacking a plurality of electromagnetic steel plates, which have different outer diameters, in a thickness direction.

In the above-described aspect, the plurality of protrusions may be arranged so as to be spaced apart from one another in a circumferential direction of the rotor core.

Another aspect of the present invention provides a rotating electric machine that includes a rotor having any of the rotor structures described above.

BRIEF DESCRIPTION OF THE DRAWINGS

FIG. 4A is a diagram for explaining a state at the time of high temperature caused by heat treatment of the rotor structure in FIG. 1.

FIG. 4B is a diagram for explaining a state at the time of normal temperature after heat treatment of the rotor structure in FIG. 1.

DESCRIPTION OF EMBODIMENT(S)

Figure 1:
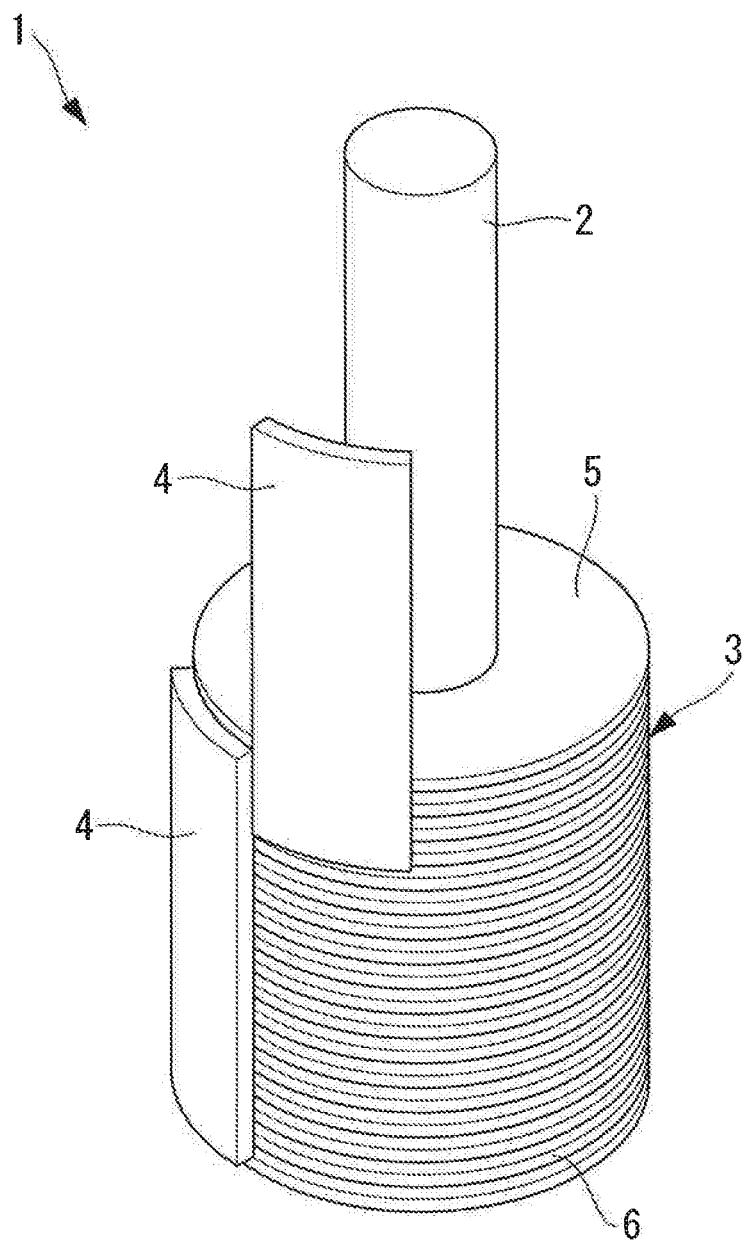
FIG. 1 is a perspective view illustrating a rotating-electric-machine rotor structure according to an embodiment of the present invention.

A rotating-electric-machine rotor structure and a rotating electric machine according to an embodiment of the present invention will be described below while referring to the drawings.

Figure 2:
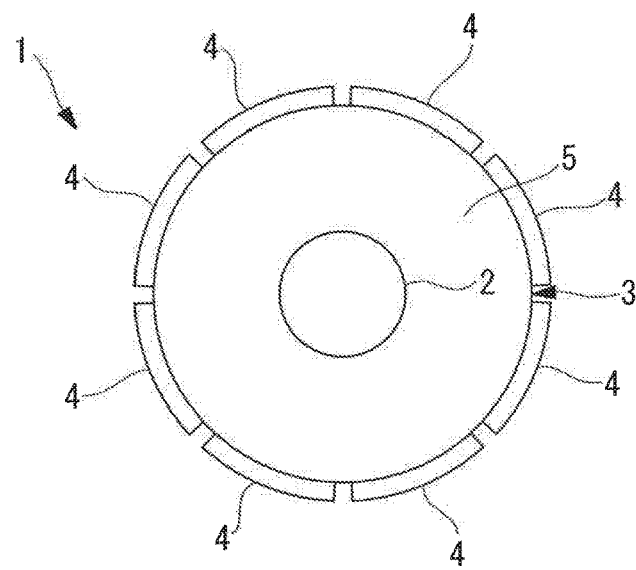
FIG. 2 is a plan view illustrating the rotor structure in FIG. 1.

The rotating electric machine according to this embodiment includes a rotor 1, which is illustrated in FIGS. 1 and 2, and a stator (not illustrated) that is arranged outside the rotor 1 in a radial direction.

The rotor 1 includes a cylindrical shaft 2, a rotor core 3 that is fixed to the shaft 2, and a plurality of permanent magnets 4 that are adhered to an outer circumferential surface of the rotor core 3.

The rotor core 3 is formed in a cylindrical shape by stacking electromagnetic steel plates 5 on top of one another in a thickness direction.

As electromagnetic steel plates 5 constitute the rotor core 3, steel plates having two different outer diameters are used. The rotor core 3 is formed by alternately or periodically stacking electromagnetic steel plates having a large outer diameter and electromagnetic steel plates having a small outer diameter. Thus, as illustrated in FIGS. 1 and 3, the rotor core 3 has a plurality of protrusions 6 that are spaced apart from one other in an axial direction and protrude radially outward direction.

The permanent magnets 4 each have a circular arc plate shape that is configured such that the permanent magnets 4 can closely contact the outer circumferential surface of the rotor core 3, and a plurality of the permanent magnets 4 are arrayed in the circumferential direction, for example, in the example illustrated in FIG. 2, eight permanent magnets 4 are arrayed in the circumferential direction and are adhered to the outer circumferential surface of the rotor core 3.

Figure 3:
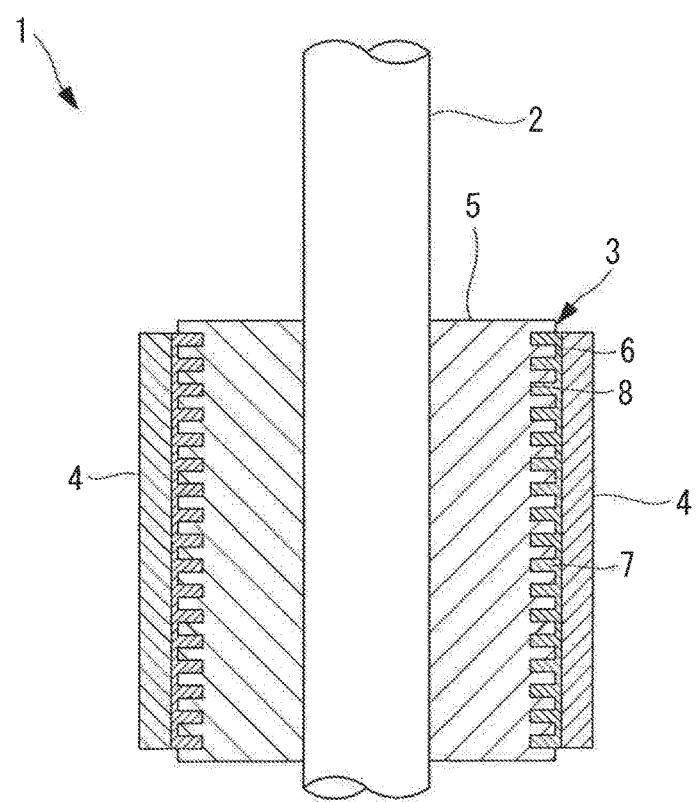
FIG. 3 is a vertical sectional view illustrating the rotor structure in FIG. 1.

In this case, as illustrated in FIG. 3, the permanent magnets 4 are adhered to the outer circumferential surface of the rotor core 3 with an adhesive 7 so as to straddle the plurality of protrusions 6 arranged in the axial direction at an interval.

The operation of the thus-configured rotating-electric-machine rotor structure according to this embodiment will be described below.

In the rotor structure according to this embodiment, when adhering the permanent magnets 4 to the rotor core 3, the adhesive 7 is applied to an adhesion surface of the rotor core 3, where the protrusions 6 are provided on the outer circumferential surface of the rotor core 3, so as to fill recesses 8 between the protrusions 6, and the adhesive 7 is cured by heating with the permanent magnets 4 being in a bonded state.

In other words, in a state where the adhesive 7 is cured by heating the rotor core 3, the permanent magnets 4, and the adhesive 7 to a high temperature, the rotor core 3, which has a large coefficient of linear expansion, is largely thermally deformed, whereas the permanent magnets 4, which have a small coefficient of linear expansion, is less thermally deformed than the rotor core 3, as illustrated in FIG. 4A.

In this state, once the heat treatment is completed and the structure is cooled to the normal temperature, as illustrated in FIG. 4B, the rotor core 3, which has a large coefficient of linear expansion, contracts by a large amount, whereas the permanent magnets 4, which have a small coefficient of linear expansion, contract by a smaller amount than the rotor core 3.

Since the permanent magnets 4 and the rotor core 3 contract by different amounts, stress that depends on the difference in the amount of contraction acts on the adhesive 7 interposed between the permanent magnets 4 and the rotor core 3 to fix the permanent magnets 4 with the rotor core 3 in the axial direction of the rotor core 3.

Figure 6A:
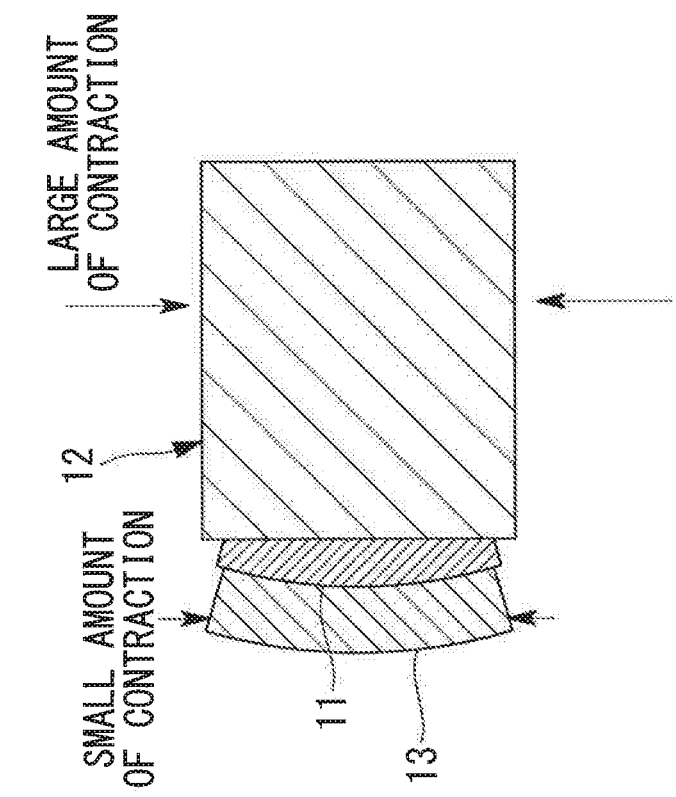
FIG. 6A illustrates a state at the time of high temperature caused by heat treatment of a reference example for explaining the operation of the rotor structure in FIG. 1.
Figure 6B:
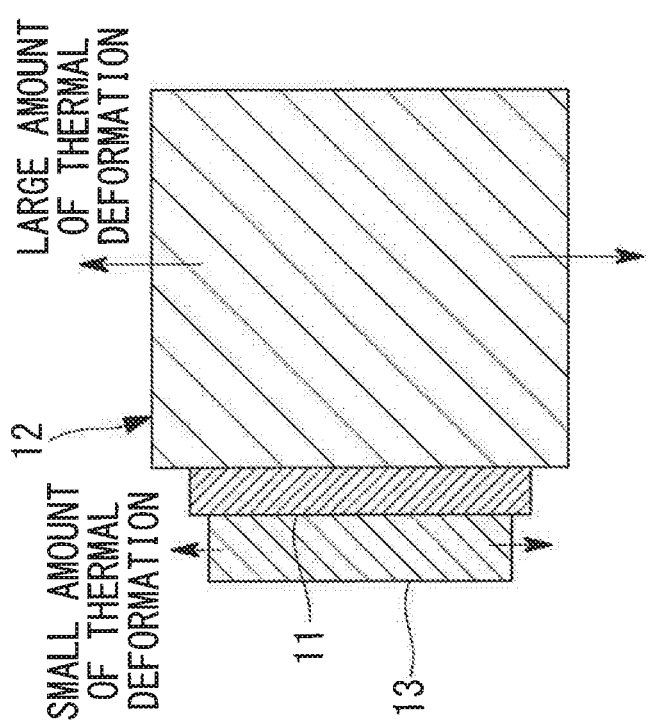
FIG. 6B illustrates a state at the time of normal temperature after the heat treatment of the reference example for explaining the operation of the rotor structure in FIG. 1.

According to a rotor structure of the related art illustrated as a reference example in FIGS. 6A and 6B, a rotor core 12 contracts by a larger amount than permanent magnets 13 upon returning to the normal temperature after an adhesive 11 is cured by heat treatment, and consequently, the permanent magnets 13 are in an elastically deformed and a large amount of residual stress remains in the adhesive 11. The residual stress results in a force being generated at the interface between the permanent magnets 13 and the adhesive 11 and at the interface between the rotor core 12 and the adhesive 11 that causes the adhesive 11 to peel off, and therefore there is a risk of the adhesive 11 peeling off due to a reduction of the adhesive force.

In the rotor structure according to this embodiment, the rotor core 3 includes the plurality of protrusions 6 that are arranged so as to be spaced apart from one another in the axial direction and that extend radially outward direction, and the adhesive 7 fills the spaces between the protrusions 6. Therefore, when stress acts on the adhesive 7 as illustrated in FIG. 4B, the residual stress acting on the adhesive 7 can be reduced by bending the protrusions 6 in the spacing direction.

Thus, the rotating-electric-machine rotor structure according to this embodiment has an advantage in that stress can be reduced by the protrusions 6 being caused to bend, and therefore, the adhesive 7 peels off can be suppressed.

A rotating electric machine that includes the rotor 1 having this structure has an advantage in that the durability of the rotating electric machine can be improved because the permanent magnets 4 are prevented from peeling off the rotor core 3.

Figure 5:
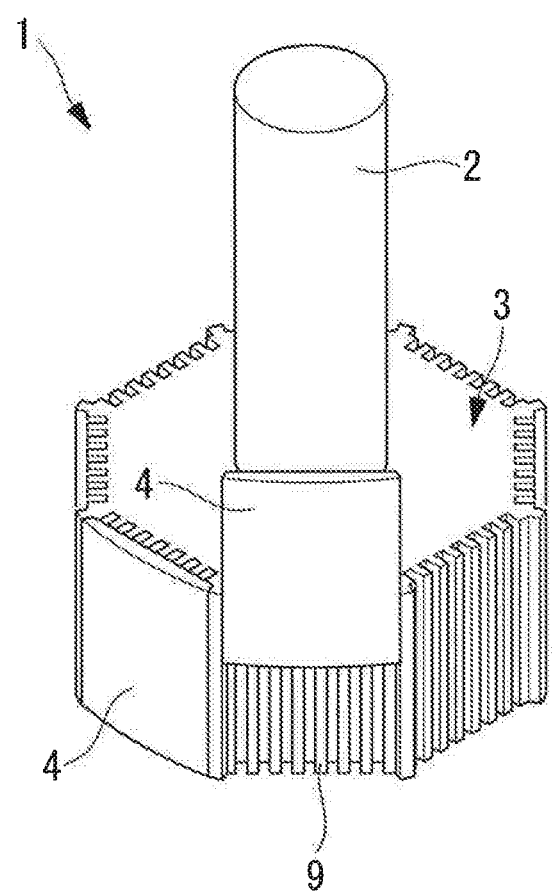
FIG. 5 is a perspective view illustrating a modification of the rotor structure in FIG. 1.

The plurality of protrusions 6 that are spaced apart from one other in the axial direction are formed by stacking two types of the electromagnetic steel plates 5 having different outer diameters in an alternating or periodical manner in this embodiment, but alternatively, a plurality of protrusions 9 that extend radially outward direction may be formed so as to be spaced apart from one another in the circumferential direction, as illustrated in FIG. 5.

In FIG. 5, the rotor core 3 is formed in a substantially eight-sided columnar shape, and the protrusions 9, which extend in the axial direction and have a protruding strip-like shape, are arranged so as to be spaced apart from one another in the circumferential direction on each of the outer surfaces of the rotor core 3.

The rotor core 3 contracts in the circumferential direction upon returning to the normal temperature after the adhesive 7 has been cured by the heat treatment, and as a result, residual stress can be reduced by the protrusions 9 being caused to bend in the circumferential direction due to a difference in the amount of contraction between the rotor core 3 and the permanent magnets 4.

In this embodiment, a plurality of protrusions 6 or 9 are provided so as to be spaced apart from one another in an axial direction or circumferential direction on an outer circumferential surface of the rotor core 3 that serves as an adhesion surface to which the permanent magnets 4 are adhered, but alternatively, a plurality of protrusions 6 or 9 may be provided so as to be spaced apart from one another in both the axial direction and the circumferential direction.

As a result, the following aspect is read from the above described embodiment of the present invention.

An aspect of the present invention provides a rotating-electric-machine rotor structure that includes: a cylindrical rotor core; and a plurality of permanent magnets that are adhered to an outer circumferential surface of the rotor core with an adhesive; wherein an adhesion surface of the rotor core, to which the permanent magnets are adhered, is provided with a plurality of protrusions that are arranged so as to be spaced apart from one another along a surface of the rotor core, that extend radially outward direction, and that are able to deform in a spacing direction.

According to this aspect, a rotor in which a plurality of permanent magnets are bonded to an outer circumferential surface of a rotor core is formed by bonding the permanent magnets to an adhesion surface provided on an outer circumferential surface of the rotor core such that the permanent magnets straddle a plurality of protrusions provided on the adhesion surface, and then curing the adhesive by performing heating. The rotor core and the magnets are adhered to each other by curing the adhesive by performing heating in a state where the rotor core and the magnets are thermally expanded by different amounts due to their respective coefficients of linear expansion.

In this case, although stress depends on the difference in the amount of thermal expansion acts on the adhesive when thermal expansion occurred to the rotor is eliminated by returning to normal temperature, the residual stress acting on the adhesive can be suppressed as a result of the protrusions provided on the adhesion surface deforming in the spacing direction to reduce the stress. As a result, the magnets peel off from the rotor core due to the difference in the amount of thermal expansion between the magnets and the rotor core can be suppressed.

In the above-described aspect, the plurality of protrusions may be arranged so as to be spaced apart from one another in an axial direction of the rotor core.

With this configuration, although stress that depends on the difference in the amount of thermal expansion acts on the adhesive in the axial direction of the rotor when thermal expansion occurred to the rotor is eliminated by returning to the normal temperature, the residual stress acting on the adhesive can be suppressed as a result of the protrusions provided on the adhesion surface deforming in the axial direction of the rotor, which is the spacing direction to reduce the stress.

In the above-described aspect, the rotor core may be formed by stacking a plurality of electromagnetic steel plates, which have different outer diameters, in a thickness direction.

With this configuration, the protrusions can be easily formed by electromagnetic steel plates having a large outer diameter that are sandwiched between electromagnetic steel plates having a small outer diameter.

In the above-described aspect, the plurality of protrusions may be arranged so as to be spaced apart from one another in a circumferential direction of the rotor core.

With this configuration, although stress that depends on the difference in the amount of thermal expansion acts on the adhesive in the circumferential direction of the rotor when thermal expansion occurred to the rotor is eliminated by returning to the normal temperature, the residual stress acting on the adhesive can be suppressed as a result of the protrusions provided on the adhesion surface deforming in the circumferential direction of the rotor, which is the spacing direction to reduce the stress.

Another aspect of the present invention provides a rotating electric machine that includes a rotor having any of the rotor structures described above.

According to this aspect, residual stress acting on the adhesive that adheres the permanent magnets and the rotor core of the rotor to each other is reduced, and therefore, the durability of the rotating electric machine can be improved by preventing the permanent magnets from peeling off the rotor core.

The invention claimed is:

1. A rotating-electric-machine rotor structure comprising:
   a cylindrical rotor core; and
   a plurality of permanent magnets that are adhered to an outer circumferential surface of the rotor core with an adhesive;
   wherein the rotor core is formed by alternately or periodically stacking a plurality of electromagnetic steel plates, the plurality of electromagnetic steel plates including a plurality of large-diameter electromagnetic steel plates having a large outer diameter and a plurality of small-diameter electromagnetic steel plates having a small outer diameter,
   wherein, in an adhesion surface of the rotor core to which the permanent magnets are adhered, a plurality of protrusions that extend in a radially outward direction are formed by a diameter difference between adjacent ones of the large-diameter electromagnetic steel plates and the small-diameter electromagnetic steel plates,
   wherein the plurality of protrusions are formed so as to deform in a stacking direction of the electromagnetic steel plates, and
   wherein the plurality of permanent magnets are adhered so as to straddle the plurality of protrusions.

2. A rotating-electric-machine rotor structure according to claim 1, wherein the plurality of protrusions are formed so as to be spaced apart from one another in an axial direction of the rotor core.

3. A rotating-electric-machine rotor structure according to claim 1, wherein the plurality of large-diameter electromagnetic steel plates and the plurality of small-diameter electromagnetic steel plates are stacked in a thickness direction.

4. A rotating-electric-machine rotor structure according to claim 1, wherein the plurality of protrusions are formed so as to be spaced apart from one another in a circumferential direction of the rotor core.

5. A rotating electric machine comprising: a rotor that includes the rotor structure according to claim 1.

* * * * *